July 3, 1923.

P. J. ARMAGNAT

WAVEMETER

Filed Aug. 9, 1920

1,460,636

Inventor:
Pierre Jules Armagnat
By Lawrence Langner
Attorney.

Patented July 3, 1923.

1,460,636

UNITED STATES PATENT OFFICE.

PIERRE JULES ARMAGNAT, OF PARIS, FRANCE.

WAVEMETER.

Application filed August 9, 1920. Serial No. 402,396.

*To all whom it may concern:*

Be it known that I, PIERRE JULES ARMAGNAT, citizen of the Republic of France, residing at Paris, France, have invented new and useful Improvements in Wavemeters, of which the following is a specification.

The present invention has for its subject a method of measuring the lengths of electric waves.

The method in question rests on the comparison of an electro-motive force, obtained by a double induction, with the difference of potential produced at the terminals of a resistance by the oscillating current to be measured.

Figure 1:
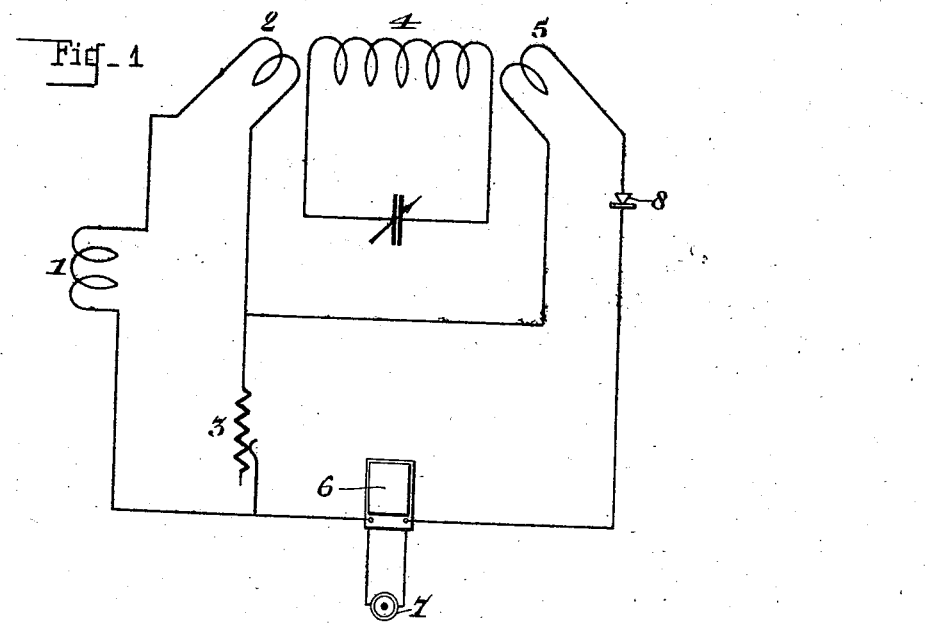
Figure 2:
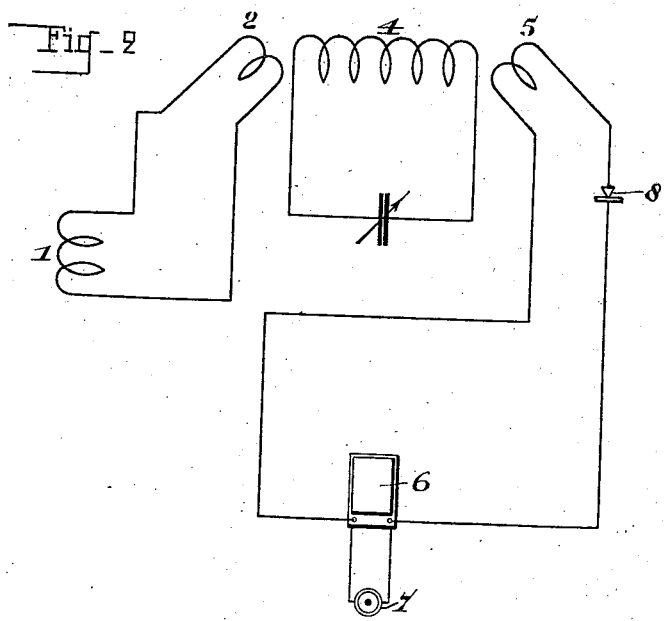

Figures 1 and 2 of the annexed drawing are diagrams illustrating connections hereinafter referred to.

In Figure 1 the oscillating current which is to be measured is generated in the coil 1; and passes into the coil 2 and the non-inductive resistance 3, which is an adjustable resistance whose value will be designated in the formulæ which follow by the letter $r$. The coil 2 acts by induction on the calibrated oscillating circuit 4, and this in its turn generates an induced electro-motive force in the coil 5.

With this arrangement let us assume the following designation.

$\omega$ the frequency of the current to be measured,

M the coefficient of mutual induction adjustable between the coil 2 and the oscillating circuit 4.

$m$ the coefficient of mutual induction between the oscillating circuit 4 and the coil 5.

$i$ the intensity of the current in 1.

$j$ the intensity of the current in the oscillating circuit 4.

$\varepsilon$ the electro-motive force induced in 5.

L the coefficient of self-induction of the oscillating circuit 4.

C the capacity of this circuit.

R the resistance of this same circuit.

We then have between the quantities $i$ and $j$ on, the one hand, and the quantities $\varepsilon$ and $j$ on the other hand, the two following relations:

(1) $\quad \mathrm{M} \cdot \dfrac{di}{dt} + \mathrm{L} \cdot \dfrac{dj}{dt} + \dfrac{1}{\mathrm{C}} \cdot \int j \cdot dt + \mathrm{R} \cdot j = 0$ (2) $\quad \varepsilon = m \cdot \dfrac{dj}{dt}.$ Integrating the differential equation resulting from the elimination of $\dfrac{dj}{dt}$ from equations (1) and (2) the following two relations are obtained:

(3) $\quad j = \dfrac{\omega \cdot \mathrm{M} \cdot i_o \cdot \cos(\omega t - \phi)}{\mathrm{R} \cdot \sqrt{1 + tg^2\phi}}$ (4) $\quad \varepsilon = \dfrac{-\omega^2 \cdot \mathrm{M} \cdot m \cdot i_o \cdot \sin(\omega t - \phi)}{\mathrm{R} \cdot \sqrt{1 + tg^2\phi}}$ with (5) $\quad tg\phi = \dfrac{\omega \mathrm{L} - \dfrac{1}{\omega \mathrm{C}}}{\mathrm{R}} = \dfrac{\omega^2 \cdot \mathrm{L} \cdot \mathrm{C} - 1}{\mathrm{R} \cdot \omega \cdot \mathrm{C}}$ These equations show that if $\phi = 0$, that is to say if $\omega^2 \cdot \mathrm{L} \cdot \mathrm{C} = 1$, the electromotive force $\varepsilon$ will be in phase, (at nearly $\pi$), with the current $i$.

It is then necessary that the oscillating circuit 4 should be exactly in tune with the oscillations generated in the coil 1.

On the other hand if the coil 5 is connected to the non-inductive resistance 3 by using connections of suitable direction, the two tensions are opposed, of which the result which is given by the formula:

(6) $\quad r i_o \cdot \sin \omega t = \dfrac{\omega^2 \cdot \mathrm{M} \cdot m \cdot i_o \cdot \sin(\omega t - \phi)}{\mathrm{R} \cdot \sqrt{1 + tg^2\phi}}$ can only be nil if $\phi = 0$ and if the factors $r$, R. M. and $m$ have values such that (7) $\quad \mathrm{R} \cdot r = \omega^2 \cdot \mathrm{M} \cdot m.$ We then obtain complete silence in the telephone, since the value of the resultant given by the formula (6) is then equal to zero. Consequently to obtain this result it is only necessary to be able to vary the value $r$ of the non-inductive resistance 3, which resistance should be increased when the pulsation $\omega$ itself increases, as will be seen by reference to equation (7), and to vary the coefficients of induction M and $m$ above specified.

When this result, (that is to say the complete silence of the telephone) is obtained, the oscillations in the circuit 4, and the current in the coil 1 are of exactly the same frequency, and therefore of the same wave length.

One can under these conditions, either graduate the oscillating circuit 4 according to the known length of the waves of the coil 1, or conversely measure the wave-length of the current which flows through the coil 1, according to a preliminary calibration of the oscillating circuit 4.

The method can be applied by using a calibrated circuit, the coils 2 and 5, an adjustable non-inductive resistance 3, a buzzer 6, a telephone 7, and a detector 8, these different and separate elements being arranged for example, on a laboratory table.

The different elements above set forth can also be grouped so as to constitute a single apparatus forming a wave controller which allows of effecting at will and by simple manipulations, either very exact measurements by using the said zero method, (diagram of Figure 1 of the drawing), or by using the resonance method (diagram of Figure 2 of the drawing.)

In Figure 2 is shown an arrangement for measuring the lengths of waves by using the resonance method. This arrangement has been illustrated in order to show that it is easy to pass from an arrangement according to Figure 1 "zero method" to the arrangement according to Figure 2, which is the normal arrangement for measuring by the resonance method. This is of interest from a practical point of view as in order to obtain zero very exact adjustments are necessary, not only of the resonance but also of $r$. M. $m$. In practice it is frequently convenient at the start to make the measurement by resonance which gives an indication of the zone where the exact point searched for is to be found, then to effect the setting by zero which permits of making a more exact measurement and of which the adjustment is facilitated by reason of the nearness of point searched for.

Having thus described my invention what I claim as new and desire to secure by Letters Patent is:—

Apparatus for use in measuring the lengths of continuous electric waves, said apparatus comprising a circuit containing a coil, a second coil and an adjustable non-inductive resistance, a calibrated oscillating circuit having a condenser and a coil in inductive relation with the coil, and a circuit containing a coil in inductive relation to the coil, a buzzer, detector, telephone and the non-inductive resistance.

In testimony whereof I have signed my name to this specification in the presence of two subscribing witnesses.

PIERRE JULES ARMAGNAT.

Witnesses:
 JULES FAYOLLET,
 ANDRÉ BORDILLON.